(12) United States Patent  
Ceder et al.

(10) Patent No.: US 8,399,130 B2
(45) Date of Patent: Mar. 19, 2013

(54) MIXED PHOSPHATE-DIPHOSPHATE ELECTRODE MATERIALS AND METHODS OF MANUFACTURING SAME

(75) Inventors: Gerbrand Ceder, Wellesley, MA (US); Anubhav Jain, Cambridge, MA (US); Geoffroy Hautier, Somerville, MA (US); Jae Chul Kim, Cambridge, MA (US); Byoungwoo Kang, Cambridge, MA (US); Robert Daniel, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 340 days.

(21) Appl. No.: 12/857,262

(22) Filed: Aug. 16, 2010

(65) Prior Publication Data

US 2012/0037844 A1    Feb. 16, 2012

(51) Int. Cl.
*H01M 4/58* (2010.01)

(52) U.S. Cl. ............... 429/231.5; 252/182.1; 423/299; 423/304; 423/305; 423/306; 423/311; 429/218.1

(58) Field of Classification Search ............. 252/182.1; 423/299, 304, 305, 306, 311; 429/218.1, 429/231.5
See application file for complete search history.

(56) References Cited

U.S. PATENT DOCUMENTS

| | | | |
|---|---|---|---|
| 4,049,891 A | 9/1977 | Hong et al. | |
| 4,302,518 A | 11/1981 | Goodenough et al. | |
| 4,357,215 A | 11/1982 | Goodenough et al. | |
| 4,507,371 A | 3/1985 | Thackeray et al. | |
| 5,910,382 A | 6/1999 | Goodenough et al. | |
| 6,391,493 B1 | 5/2002 | Goodenough et al. | |
| 6,514,640 B1 | 2/2003 | Armand et al. | |
| 7,622,224 B2 | 11/2009 | Si Larbi Jouanneau et al. | |

FOREIGN PATENT DOCUMENTS

CN    101 997 109 A    3/2011

OTHER PUBLICATIONS

Kuang et al., "Layered monodiphosphate Li9V3(P2O7)3(PO4)2: A novel cathode material for lithium-ion batteries," Electochimica Acta 56 (2011) pp. 2201-2205.

Xu et al., "Preparation and electrochemical properties of Cr-doped Li9 V3 (P2O7)3(PO4)2 as cathode materials for lithium-ion batteries," Electrochimica Acta (2011), 20 pages.

International Search Report and Written Opinion mailed on Jul. 26, 2011, for PCT Application No. PCT/US2011/031946, 12 pages.

Kuang, et al., Synthesis, Structure, Electronic, Ionic, and Magnetic Properties of $Li_9V_3(P_2O_7)_3(PO_4)_2$ Cathode Material for Li-Ion Batteries.

(Continued)

*Primary Examiner* — Mark Kopec
*Assistant Examiner* — Haidung Nguyen
(74) *Attorney, Agent, or Firm* — Choate, Hall & Stewart LLP

(57) ABSTRACT

This invention relates generally to electrode materials, electrochemical cells employing such materials, and methods of synthesizing such materials. The electrode materials have a crystal structure with a high ratio of Li to metal M, which is found to improve capacity by enabling the transfer of a greater amount of lithium per metal, and which is also found to improve stability by retaining a sufficient amount of lithium after charging. Furthermore, synthesis techniques are presented which result in improved charge and discharge capacities and reduced particle sizes of the electrode materials.

12 Claims, 12 Drawing Sheets

OTHER PUBLICATIONS

Capitelli, F. et al., "New monodiphosphate $Li_9Cr_3(P_2O_7)_3(PO_4)_2$: X-ray crystal structure and vibrational spectroscopy," Z. Kristallographie, vol. 222, pp. 521-526 (2007).

Falah, C. et al., "Crystal structure and cation transport properties of the layered monodiphosphates $Rb_6Bi_4(PO_4)_2(P_2O_7)_3$," Journal of Solid State Chemistry, vol. 173, pp. 342-349, (2003).

Ji, F. et al., "Hydrothermal Synthesis of LI9Fe3(P2O7)3(PO4)2 Nanoparticles and Their Photocatalytic Properties under Visible-Light Illumination," Applied Materials & Interfaces, vol. 2, No. 6, pp. 1674-1678, (2010).

Liu, X., et al., "The layered monodiphosphate $Li_9Ga_3(P_2O_7)_3(PO_4)_2$ refined from X-ray powder data," Acta Crystallographica, Section E62, pp. i112-i113, (2006).

Poisson, S. et al., "Crystal Structure and Cation Transport Properties of the Layered Monodiphosphates: $Li_9M_3(P_2O_7)_3(PO_4)_2$ (M=Al, Ga, Cr, Fe)," Journal of Solid State Chemistry, vol. 138, pp. 32-40, (1998).

MIXED PHOSPHATE-DIPHOSPHATE ELECTRODE MATERIALS AND METHODS OF MANUFACTURING SAME

FIELD OF THE INVENTION

This invention relates generally to improved electrode materials. More particularly, in certain embodiments, the invention relates to electrode materials, electrochemical cells employing such materials, and methods of synthesizing such materials.

BACKGROUND OF THE INVENTION

A battery has at least one electrochemical cell that typically includes a positive electrode, a negative electrode, and an electrolyte. One type of battery, the lithium ion battery, has important technological and commercial applications. Lithium ion batteries are currently the dominant form of energy storage media for portable electronics, and new application areas such as hybrid and electric vehicles may further increase their demand. Improved material components for lithium ion batteries are therefore continually sought, and one such component is the battery cathode. New electrode materials have the potential to increase the capacity, rate capability, cyclability, stability, and safety of lithium ion batteries while potentially reducing their cost.

Current electrode materials, such as $LiCoO_2$, $LiFePO_4$, and $LiMn_2O_4$, suffer from some mixture of limited capacity, limited safety, limited stability, limited rate capability, and high cost. There is a need for electrode materials that have greater capacity, safety, rate capability, and stability than current materials, yet which are feasible for commercial production.

SUMMARY OF THE INVENTION

The invention relates to electrode materials, e.g., cathode and/or anode materials, having a crystal structure that is unusual in its high ratio of Li to metal M. Current electrode materials such as $LiCoO_2$, $LiFePO_4$, and $LiMn_2O_4$ allow only 0.5-1 Li to be transferred per metal. In contrast, preferred embodiments of the electrode materials described herein have a crystal structure with Li:M ratio greater than 1:1, for example, a ratio of 3:1, which allows up to three Li to be exchanged per metal. The successful preparation and testing of experimental examples of these materials are described herein.

Because the amount of charge that can be transferred in an electrode material depends on the amount of Li present, and because the weight and cost of the electrode material depends heavily on the metal content, the crystal structure described herein allows high amounts of Li to be transferred for a low amount of metal. Thus, the electrode material described herein allows for large charging capacities at low weight and low cost. Moreover, after charging, it is presently found that electrode materials with low Li:M ratio may retain an insufficient amount of lithium, which leads to stability problems. Not only do the new electrode materials presented herein improve capacity by enabling the transfer of a greater amount of lithium per metal, they also improve stability by retaining a sufficient amount of lithium after charging. The residual lithium is thought to form a bonding network that holds certain layers of the crystal structure together after removal of the active lithium, thereby preventing decomposition of the electrode material.

The electrode materials described herein also feature vanadium, molybdenum, or a combination of vanadium and molybdenum as active redox couple. It is seen that vanadium and molybdenum are uniquely capable of supporting two-electron reactions and three-electron reactions, respectively, at voltages below the limit of current commercial electrolytes, e.g., below about 4.6-4.7 V. It is believed that other metals such as Cr, Mn, Fe, and Co result in voltages that are too high to support two-electron reactions when used in the crystal structure described herein. This is particularly true when these other metals are used in conjunction with electrolytes useful in most current lithium ion batteries.

The invention also relates to methods of preparing the electrode materials described herein. Synthesis techniques are presented herein which result in improved charge and discharge capacities and reduced particle sizes of the electrode materials described herein. The techniques also allow lower synthesis temperatures to be used, thereby reducing production costs.

In one aspect, the invention relates to an electrode material including $Li_9(V,Mo)_3(P_2O_7)_3(PO_4)_2$. In certain embodiments, the electrode material includes at least one dopant selected from the group consisting of nickel, cobalt, manganese, iron, titanium, copper, silver, magnesium, calcium, strontium, zinc, aluminum, chromium, gallium, germanium, tin, tantalum, niobium, zirconium, fluorine, sulfur, yttrium, tungsten, silicon, and lead. (V,Mo) may be V, Mo, or any combination of V and Mo. In one embodiment, (V,Mo) is V. In another embodiment, (V,Mo) is Mo. The description of elements of the embodiments above can be applied to this aspect of the invention as well.

In another aspect, an electrode material includes $A_{9-3x}M_{3+x}(P_2O_7)_{3-y/4}(PO_4)_{2+y/3}$ wherein A is at least one member selected from the group consisting of lithium, sodium, potassium, rubidium, cesium, magnesium, calcium, strontium, and barium, where A is at least 50 mol percent Li, M is at least one member selected from the group consisting of vanadium, molybdenum, nickel, cobalt, manganese, iron, titanium, copper, silver, zinc, aluminum, chromium, gallium, germanium, tin, tantalum, niobium, zirconium, yttrium, tungsten, silicon, and lead, where M is at least 50 mol percent (V,Mo), x ranges from about −0.2 to about 0.2, and y ranges from about −1.0 to about 1.0. In certain embodiments, A is Li. In one embodiment, x is zero and y is zero. In another embodiment, M is V. In yet another embodiment, M is Mo. The description of elements of the embodiments above can be applied to this aspect of the invention as well.

In another aspect, an electrode material includes anionic corrugated layers of $[(V,Mo)(P_2O_7)_3(PO_4)_2]^{-9}$ separated by lithium ions. In certain embodiments, each of the corrugated layers include $(V,Mo)O_6$ octahedra each having corners (oxygen) shared with monophosphate $(PO_4)$ and diphosphate $(P_2O_7)$ groups. In one embodiment, each of the $(V,Mo)O_6$ octahedra includes: (a) first and second adjacent oxygens shared with a single diphosphate $(P_2O_7)$ group, (b) third and fourth oxygens shared with two monophosphate $(PO_4)$ groups, and (c) fifth and sixth oxygens shared with two diphosphate $(P_2O_7)$ groups. In another embodiment, the electrode material includes at least one dopant selected from the group consisting of nickel, cobalt, manganese, iron, titanium, copper, silver, magnesium, calcium, strontium, zinc, aluminum, chromium, gallium, germanium, tin, tantalum, niobium, zirconium, fluorine, sulfur, yttrium, tungsten, silicon, and lead. The description of elements of the embodiments above can be applied to this aspect of the invention as well.

In another aspect, an electrode material includes $Li_aM_bD_c(P_2O_7)_d(PO_4)_e$ wherein M is at least one of vanadium (V) and molybdenum (Mo), D is at least one member selected from the group consisting of lithium, sodium, potassium, rubidium, cesium, magnesium, calcium, strontium, barium, nickel, cobalt, manganese, iron, titanium, copper, silver, zinc, aluminum, chromium, gallium, germanium, tin, tantalum, niobium, zirconium, fluorine, sulfur, yttrium, tungsten, silicon, and lead, $5 \leq a \leq 12$, $1.5 \leq b \leq 4$, $0 \leq c \leq 1.5$, $2.75 \leq d \leq 3.25$, and $1.67 \leq e \leq 2.33$. In one embodiment, a=9, b=3, c=0, d=3, and e=2. In another embodiment, M is V. In yet another embodiment, M is Mo. The description of elements of the embodiments above can be applied to this aspect of the invention as well.

In another aspect, a method of preparing $Li_9V_3(P_2O_7)_3(PO_4)_2$ includes the steps of (a) contacting $Li_2CO_3$, $NH_4H_2PO_4$, and at least one of $V_2O_5$, $V_2O_3$, $NH_4VO_3$, $V(SO_4)_7H_2O$, $V_2(SO_4)_3$, and $VO(SO_4)_2H_2O$ in a reactor vessel to produce a mixture, (b) exposing the mixture to a reducing gas, and (c) heating the mixture at an elevated temperature, wherein the elevated temperature is from about 300° C. to about 950° C. In one embodiment, step (a) includes contacting $Li_2CO_3$, $NH_4H_2PO_4$, and $V_2O_5$ in a molar ratio of x:y:z, wherein x is from about 4.2 to about 4.8, y is from about 7.8 to about 8.2, and z is from about 1.3 to about 1.7. In another embodiment, x is about 9, y is about 16, and z is about 3. In yet another embodiment, the reducing gas includes at least one member selected from the group consisting of $H_2$, He, Ne, and Ar. In still another embodiment, the reducing gas is a mixture of about zero percent to about 10 percent $H_2$ and about 90 percent to about 100 percent Ar. In yet another embodiment, the temperature is from about 600° C. to about 850° C. The description of elements of the embodiments above can be applied to this aspect of the invention as well.

In another aspect, a method of producing particles is provided, the method including the steps of (a) preparing a material including $Li_9(V,Mo)_3(P_2O_7)_3(PO_4)_2$, and (b) milling the material to produce particles having an average diameter from about 50 nm to about 20 microns. For example, this method preferably results in smaller particles. In one embodiment, step (b) includes ball-milling the material. In another embodiment, the method includes introducing an additive to provide the particles with a conductive coating. In yet another embodiment, introducing the additive is performed during heat treatment in step (a) or during milling in step (b), or both. In still another embodiment, the additive includes at least one member selected from the group consisting of carbon black, conductive, high purity carbon black, cellulose acetate, and sucrose. The description of elements of the embodiments above can be applied to this aspect of the invention as well.

In one embodiment, the average diameter is from about one micron to about 20 microns. In another embodiment, the method includes introducing a milling additive to reduce particle size, wherein the milling additive includes carbon black. In yet another embodiment, the milling additive includes a conductive, high purity carbon black. In still another embodiment, the use of the milling additive allows the heat treatment in step (a) to be performed at a lower temperature. The description of elements of the embodiments above can be applied to this aspect of the invention as well.

In another aspect, a method of preparing $Li_9Mo_3(P_2O_7)_3(PO_4)_2$ includes the steps of (a) contacting $Li_2CO_3$, $NH_4H_2PO_4$, and at least one of $Mo_2O_3$, $MoO_2$, $MoP_2O_7$, $MoOPO_4$, Mo, $H_2MoO_4$, and $MoO_3$ in a reactor vessel to produce a mixture, (b) exposing the mixture to a reducing gas, and (c) heating the mixture at an elevated temperature, wherein the elevated temperature is from about 550° C. to about 1000° C. In certain embodiments, step (a) includes contacting $Li_2CO_3$, $NH_4H_2PO_4$, and $Mo_2O_3$ in a molar ratio of x:y:z, wherein x is from about 4.2 to about 4.8, y is from about 7.8 to about 8.2, and z is from about 1.3 to about 1.7. In one embodiment, x is about 9, y is about 16, and z is about 3. In another embodiment, the reducing gas includes at least one member selected from the group consisting of $H_2$, He, Ne, and Ar. In yet another embodiment, the reducing gas is a mixture of about zero percent to about 10 percent $H_2$ and about 90 percent to about 100 percent Ar. In still another embodiment, the temperature is from about 600° C. to about 850° C. The description of elements of the embodiments above can be applied to this aspect of the invention as well.

In another aspect, a lithium battery includes one of the electrode materials described above. In certain embodiments, the lithium battery is configured such that at least one member selected from the group consisting of V, Mo, and (V,Mo) is reduced during operation of the battery. The description of elements of the embodiments above can be applied to this aspect of the invention as well.

In yet another aspect, a composition of matter includes $Li_9V_3(P_2O_7)_3(PO_4)_2$.

BRIEF DESCRIPTION OF THE DRAWINGS

The objects and features of the invention can be better understood with reference to the drawing described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

DETAILED DESCRIPTION

Figure 1A:
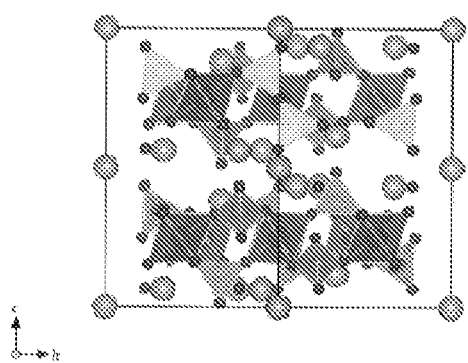
FIGS. 1a and 1b are graphs showing the crystal structure of a compound, according to illustrative embodiments of the invention.

It is contemplated that compositions, mixtures, systems, methods, and processes of the claimed invention encompass variations and adaptations developed using information from the embodiments described herein. Adaptation and/or modification of the compositions, mixtures, systems, methods, and processes described herein may be performed by those of ordinary skill in the relevant art.

Throughout the description, where systems are described as having, including, or comprising specific components, or where processes and methods are described as having, including, or comprising specific steps, it is contemplated that, additionally, there are systems of the present invention that consist essentially of, or consist of, the recited components, and that there are processes and methods according to the present invention that consist essentially of, or consist of, the recited processing steps.

Similarly, where mixtures and compositions are described as having, including, or comprising specific compounds and/or materials, it is contemplated that, additionally, there are mixtures and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

A composition, $Li_9(V,Mo)_3(P_2O_7)_3(PO_4)_2$, is presented herein, which provides advantageous properties, for example, for use in a cathode of a lithium battery. In this notation (V,Mo) is V, Mo, or any mixture of V and Mo. For example, when (V,Mo) is V, the composition is a vanadium composition having the formula $Li_9V_3(P_2O_7)_3(PO_4)_2$. When (V,Mo) is Mo, the composition is a molybdenum composition having the formula $Li_9Mo_3(P_2O_7)_3(PO_4)_2$.

In certain embodiments, the composition includes a dopant of, for example, one or more metallic elements. In some embodiments, the dopant is nickel, cobalt, manganese, iron, titanium, copper, silver, magnesium, calcium, strontium, zinc, aluminum, chromium, gallium, germanium, tin, tantalum, niobium, zirconium, fluorine, sulfur, yttrium, tungsten, silicon, and/or lead.

The following composition is also presented herein, which provides advantageous properties, for example, for use in a cathode of a lithium battery:

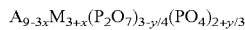

where A is one or more metals, M is one or more metals, x ranges from about −0.2 to about 0.2, and y ranges from about −1 to about 1. In some embodiments, A is at least 50 percent Li and M is at least 50 percent V, Mo, or a mixture thereof. Alternatively, A is at least 60, 70, 80, 90, or 100 percent Li and/or M is at least 60, 70, 80, 90, or 100 percent V, Mo, or a mixture thereof. A and/or M may also include one or more dopants, such as, for example, sodium, potassium, rubidium, cesium, magnesium, calcium, strontium, barium, nickel, cobalt, manganese, iron, titanium, copper, silver, zinc, aluminum, chromium, gallium, germanium, tin, tantalum, niobium, zirconium, yttrium, tungsten, silicon, and lead. In certain embodiments, A is Li and/or M is V, Mo, or a mixture thereof. x and/or y may be zero.

Figure 1B:
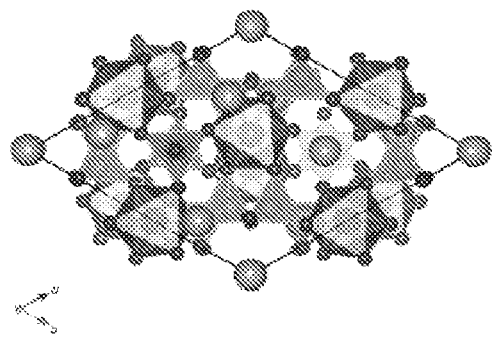

FIGS. 1a and 1b are graphs showing the crystal structure of a compound, according to an illustrative embodiment of the invention. The composition has a structure that belongs to the P-3c1 (165) space group. As depicted, the structure includes continuous, anionic corrugated layers of $[(V,Mo)(P_2O_7)_3(PO_4)_2]^{9-}$ separated by lithium ions. The layers include $(V,Mo)O_6$ octahedra sharing corners (i.e., oxygen) with monophosphate $(PO_4)$ and diphosphate $(P_2O_7)$ groups. Two adjacent oxygen from an $MO_6$ octahedron are shared with a single $P_2O_7$ group. Two other oxygen are connected to two other $P_2O_7$ groups, and the two remaining oxygen are shared with two $PO_4$ groups. In FIGS. 1a and 1b, the $(V,Mo)O_6$ octahedra around the (V,Mo) atoms are depicted in red, the $PO_4$ and $P_2O_7$ tetrahedra around the phosphorus atoms are in grey, and the lithium atoms are in green.

Figure 2:
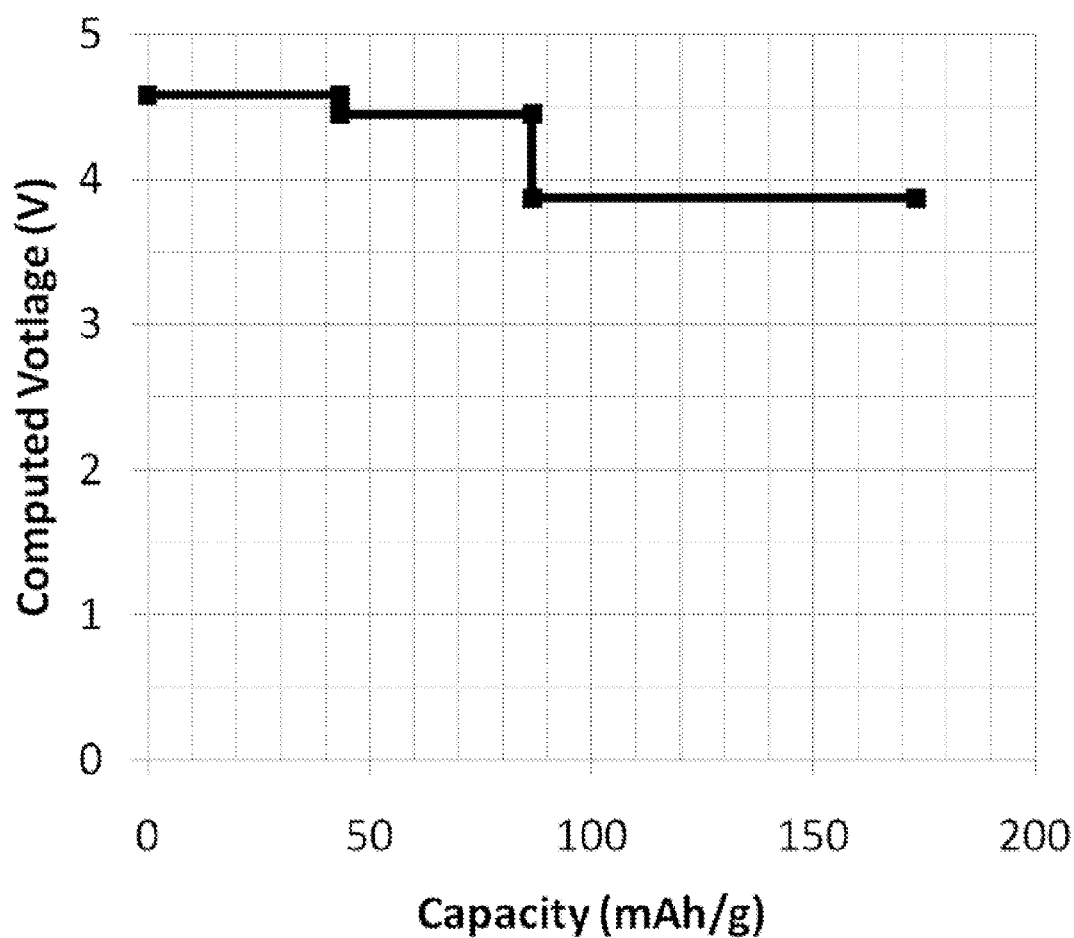
FIG. 2 is a graph showing the computationally-predicted electrochemical profile of the vanadium composition, according to illustrative embodiments of the invention.
Figure 3:
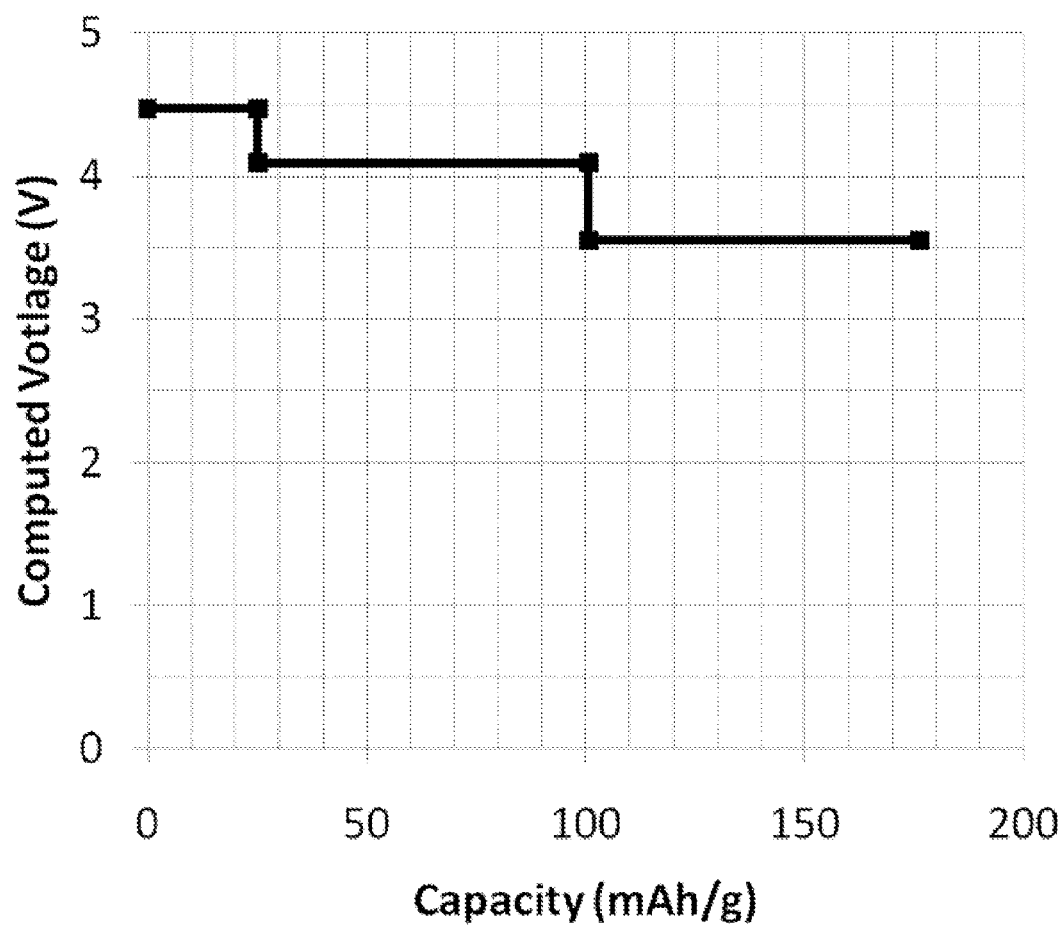
FIG. 3 is a graph showing the computationally-predicted electrochemical profile of the molybdenum composition, according to illustrative embodiments of the invention.

FIGS. 2 and 3 are graphs showing the computationally-predicted electrochemical profiles of the vanadium composition and the molybdenum composition, respectively, under the density functional theory framework with +U corrections applied to transition metals. The compositions are advantageously capable of supporting two-electron reactions and voltages below the limit of current commercial electrolytes (i.e., below about 4.6 to 4.7 volts). In the case of vanadium, two redox couples are available ($V^{3+/4+}$ and $V^{4+/5+}$), whereas in the case of molybdenum, three redox couples are available ($Mo^{3+/4+}$, $Mo^{4+/5+}$, and $Mo^{5+/6+}$). Other formulations of $Li_9M_3(P_2O_7)_3(PO_4)_2$ (e.g., where M is Cr, Mn, Fe, or Co), result in voltages that are too high to support two-electron reactions when used in conjunction with electrolytes used in most current lithium ion batteries. When M is Mn, a one-electron reaction may be feasible by using the 3+/4+ redox couple, but such a reaction would lead to poor theoretical capacity of ~85 mAh/g.

The crystal structure of the composition is unique in its high ratio of lithium to metal, which allows up to three lithium to be exchanged per vanadium and/or molybdenum. Because the amount of charge that can be transferred in an electrode material depends on the amount of lithium present in the material, the composition and its structure advantageously allow high amounts of lithium to be transferred for a low amount of metal. In addition, since the weight and cost of the electrode material depend heavily on the metal content, the composition provides the possibility of achieving large charge capacities at low weight and cost.

In the case where less than three lithium are transferred per metal, for example, in the M=V formulation where 2 Li transfer per V, the crystal structure will contain some residual Li after charging. This residual Li forms a bonding network that holds together the $[M(P_2O_7)_3(PO_4)_2]^{9-}$ layers after charging. Thus, the excess Li acts as a stabilization mechanism to keep the $[M(P_2O_7)_3(PO_4)_2]^{9-}$ together after the removal of active Li, thereby preventing decomposition of the material. This built-in stabilization mechanism is another unique feature of the proposed crystal structure.

Computations performed using Density Functional Theory with +U corrections indicate the composition has the following properties: an average voltage of about 3.9V for the $V^{3+/4+}$ redox couple, and about 4.4V for the $V^{4+/5+}$ redox couple; a theoretical 725 Wh/kg and 1916 Wh/l energy density using the two redox couples (theoretical capacity of 173 mAh/g); good insertion properties (delithiated state only mildly metastable); and fair stability with respect to oxygen release, comparable to $MnO_2$ spinel compounds currently in use as lithium ion battery cathodes.

Figure 4:
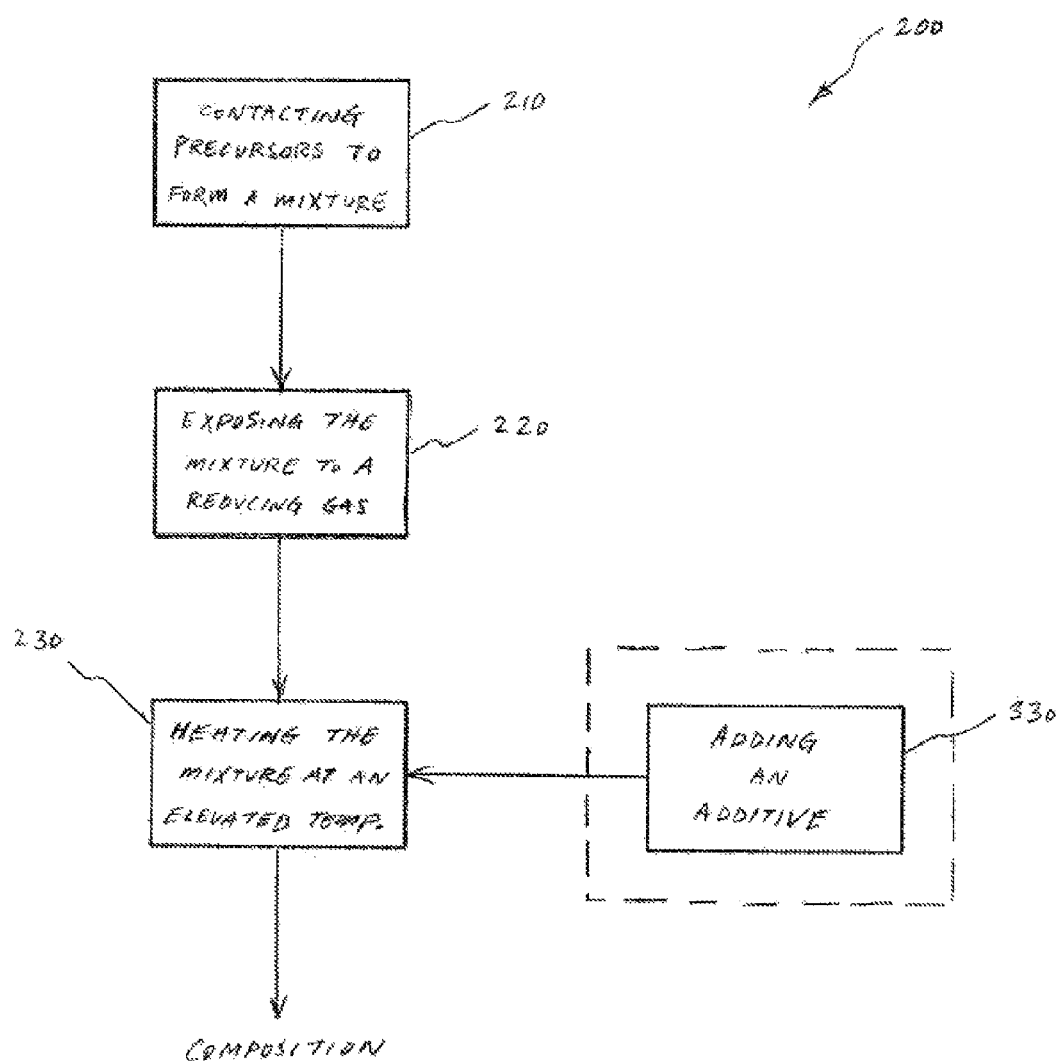
FIG. 4 is a flowchart showing a method of preparing a composition, according to illustrative embodiments of the invention.

FIG. 4 depicts a method 200 for preparing the composition, $Li_9(V,Mo)_3(P_2O_7)_3(PO_4)_2$, that includes mixing or contacting precursors in a reactor vessel to produce a mixture (step 210), exposing the mixture to a reducing gas (step 220), and heating the mixture at an elevated temperature (step 230). Steps 220 and 230 are preferably performed simultaneously. The precursors include one or more lithium-containing precursors, one or more phosphorous-containing precursors, one or more vanadium-containing precursors, and/or one or more molybdenum containing precursors. Possible lithium-containing precursors include $Li_2CO_3$, $Li_3PO_4$, $LiH_2PO_4$, $LiOH$, $LiNO_3$, $LiF$, $Li_2C_2O_4$, $Li(CH_3COO)$, and $Li_4P_2O_7$. Possible phosphorous-containing precursors include $NH_4H_2PO_4$, $Li_3PO_4$, $MoP_2O_7$, $MoOPO_4$, $NH_4VO_3$, $LiH_2PO_4$, $(NH_4)_2HPO_4$, $H_3PO_4$, $P_2O_5$, $Li_4P_2O_7$, and $LiH_2PO_4$. Possible vanadium-containing precursors include $V_2O_5$, $V_2O_3$, $NH_4VO_3$, $V(SO_4)_7H_2O$, $V_2(SO_4)_3$, and $VO(SO_4)_2H_2O$. Possible molybdenum-containing precursors include $Mo_2O_3$, $MoO_2$, $MoP_2O_7$, $MoOPO_4$, $Mo$, $H_2MoO_4$, and $MoO_3$.

The precursors used to make the vanadium composition are, for example, $Li_2CO_3$, $NH_4H_2PO_4$, and $V_2O_3$ and/or $V_2O_5$. In step 210, for example, $Li_2CO_3$, $NH_4H_2PO_4$, and $V_2O_5$ are contacted at a molar ratio of x:y:z, where x is from about 4.2 to about 4.8, y is from about 7.8 to about 8.2, and z is from about 1.3 to about 1.7. In one embodiment, x is about 9, y is about 16, and z is about 3.

The precursors used to make the molybdenum composition are, for example, $Li_2CO_3$, $NH_4H_2PO_4$, and $Mo_2O_3$ and/or $MoO_2$. In step 210, for example, $Li_2CO_3$, $NH_4H_2PO_4$, and $Mo_2O_3$ are contacted at a molar ratio of x:y:z, where x is from about 4.2 to about 4.8, y is from about 7.8 to about 8.2, and z is from about 1.3 to about 1.5. In certain embodiments, x is about 9, y is about 16, and z is about 3.

Alternatively, a precursor is used that provides at least two of lithium, phosphorous, vanadium, and molybdenum. Examples of such precursors include $Li_3PO_4$, $MoP_2O_7$, and $MoOPO_4$.

In step 220, the reducing gas is, for example, $H_2$, He, Ne, and/or Ar. In certain embodiments, the reducing gas is a mixture of about zero percent to about 10 percent $H_2$ and about 90 percent to about 100 percent Ar. For example, the reducing gas may be about 5 percent $H_2$ and about 95 percent Ar, or about 3 percent $H_2$ and about 97 percent Ar.

In step 230, the elevated temperature is from about 300° C. to about 1000° C. For example, the elevated temperature is from about 550° C. to about 850° C. or about 800° C. The mixture is heated in step 230 for a reaction time lasting from about 3 hours to about 48 hours or, for example, about 12 hours.

Figure 5:
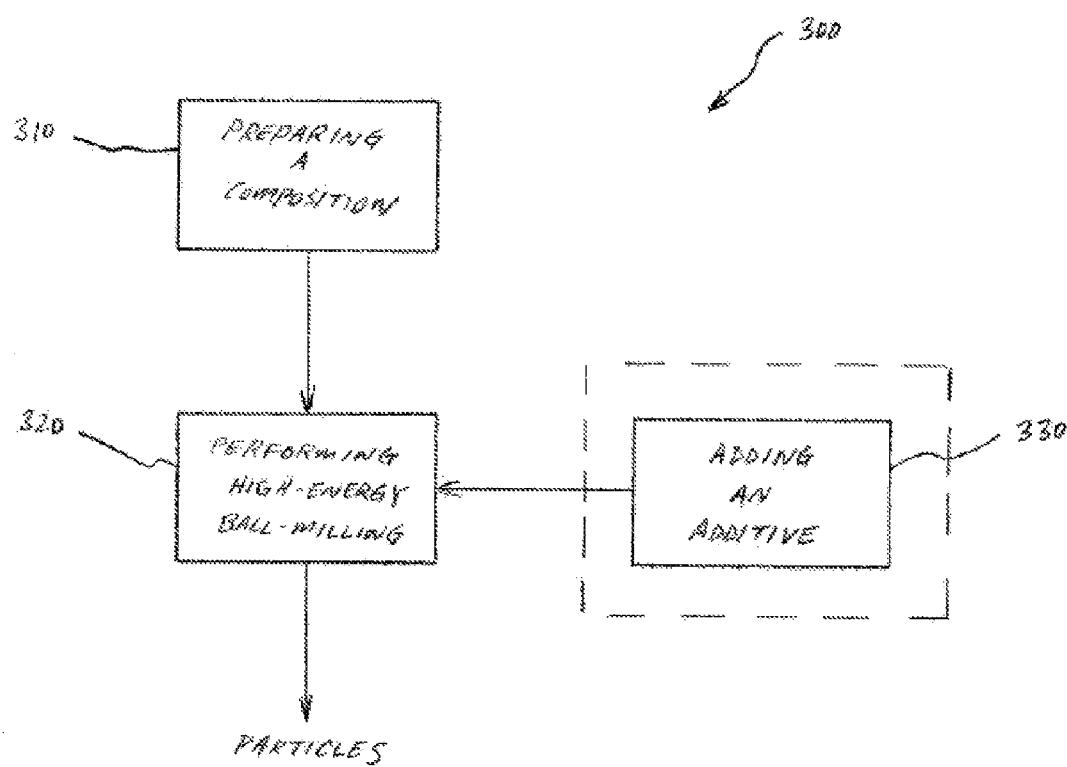
FIG. 5 is a flowchart showing a method of preparing particles, according to illustrative embodiments of the invention.

FIG. 5 depicts a method 300 of producing smaller particles with enhanced conductivity. The method includes preparing a material comprising $Li_9(V,Mo)_3(P_2O_7)_3(PO_4)_2$ (step 310) and milling the material to produce particles (step 320). The milling may be, for example, high energy ball-milling. To produce smaller particles, a milling additive, such as SUPER P® carbon (a conductive, high purity carbon black), and/or cellulose acetate may be added during steps 310 and/or step 320. Resulting particles may have an average diameter from about 50 nm to about 20 microns, or from about 1 micron to about 20 microns. The milling additive may allow heat treatment in step 310 to be performed at a lower temperature.

To provide the particles with a conductive coating, an additive of, for example, carbon black, SUPER P® carbon, and/or sucrose, is introduced (step 330). The additive may be introduced before and/or during heat treatment in step 230 and/or during ball milling in step 320. The additive improves the electrochemical performance of the material by facilitating electronic conductivity. When the additive is introduced before the heat treatment, in addition to improving electronic conductivity, it also has the effect of lowering the temperature necessary to form the desired material. The lower temperature in turn also leads to reduced particle size. In some embodiments, a PTFE binder is added to adhere together the material and the additive, which are normally dry powders and may not adhere together well on their own. An electrode may include, for example, 80 wt % active material, 15 wt % carbon black, and 5 wt % PTFE binder.

The additive, milling additive, and the milling process itself are utilized to achieve two goals: (a) reduce particle size and (b) improve electronic conductivity. Goal (a) may be achieved by milling the material without the additives after the high-temperature treatment. Goals (a) and (b) may be achieved by milling the material with the additive and/or milling additive. Alternatively, and possibly more effectively, goals (a) and (b) may be achieved by milling with the additive and/or milling additive before the high-temperature treatment is performed. With this latter option, the milling is performed after mixing the precursors but before heating the mixed precursors.

In certain embodiments, the composition is used as an electrode material in an electrochemical device, such as a lithium battery. In a preferred embodiment, the electrode material is a cathode material.

EXPERIMENTAL EXAMPLES

Example 1

The vanadium composition was prepared via solid-state reaction using the precursors $Li_2CO_3$, $NH_4H_2PO_4$, $V_2O_5$ in stoichiometric amounts, placed in a 250 ml sealed jar with $ZrO_2$ balls ranging from 3-11 mm in diameter, ball milling with acetone for 48 hours at 300 RPM on a Paul O. Abbe Inc. rolling mill (model JRM), dried on a hot plate with a stir bar until a dry powder was achieved, pelletizing, heating under air for six hours at 300° C. in a Lindberg/Blue Box Furnace, regrinding with a mortar and pestle, pelletizing, and heating again for 24 hours at 800° C. under a steady flow of reducing gas (97% Ar, 3% $H_2$) in a Lindberg/Blue tube furnace. Trace amounts of $Li_4P_2O_7$ and $Li_3V_2(PO_4)_2$ were detected in the final powder.

Figure 6:
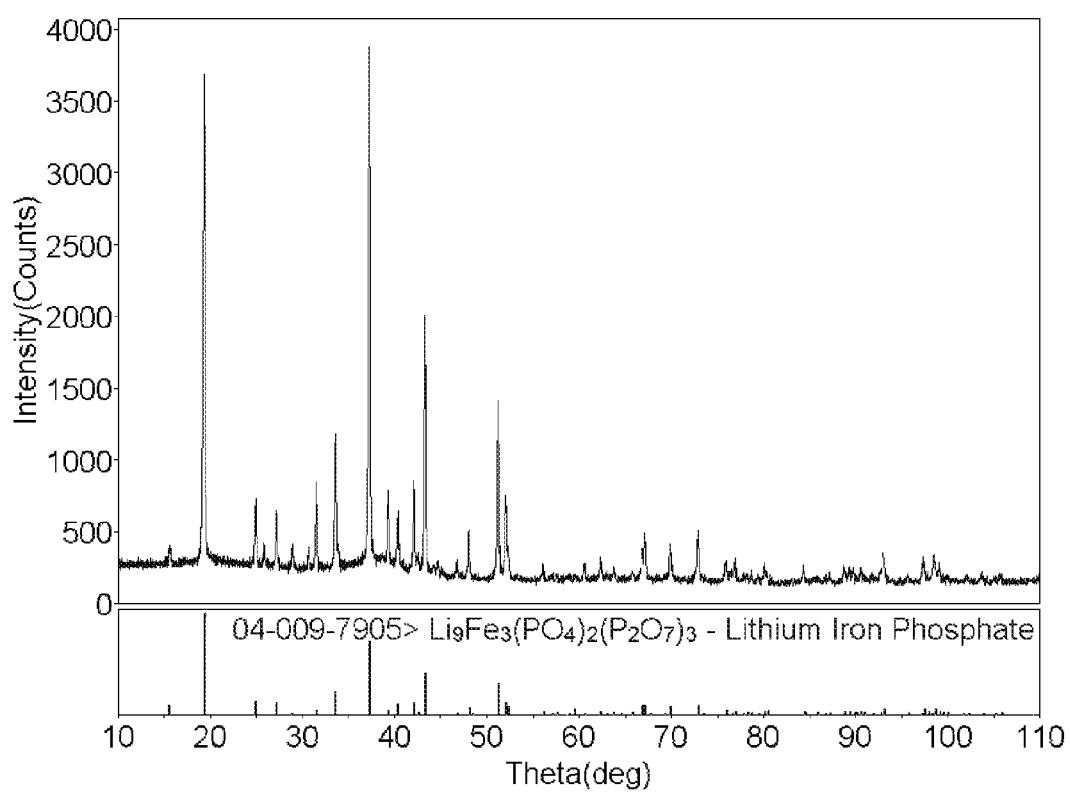
FIG. 6 is a graph showing the X-Ray Diffraction pattern of a composition, according to illustrative embodiments of the invention.

FIG. 6 shows the X-Ray Diffraction (XRD) pattern of the final powder using a Rigaku Miniflex Diffractometer with a Cr source, along with XRD matching against an iron composition of $Li_9Fe_3(P_2O_7)_3(PO_4)_2$. Referring to this figure, the prepared vanadium composition shows the same crystal structure as the iron composition.

Example 2

Figure 7:
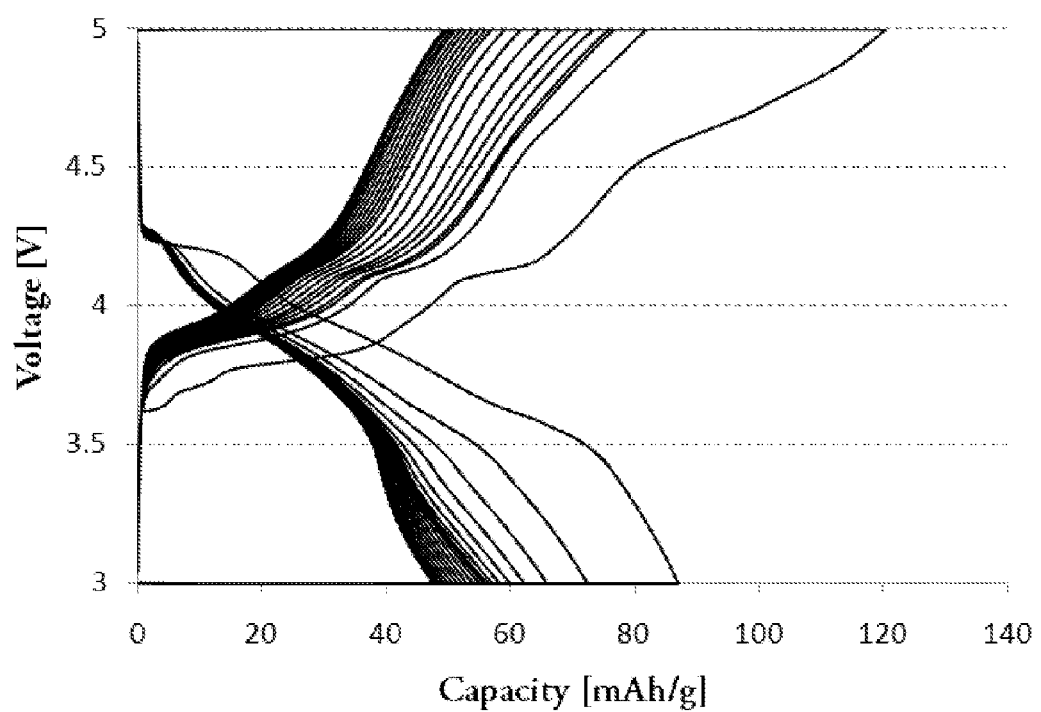
FIG. 7 is a plot of voltage versus capacity at C/20 rate for a vanadium composition, according to illustrative embodiments of the invention.
Figure 8:
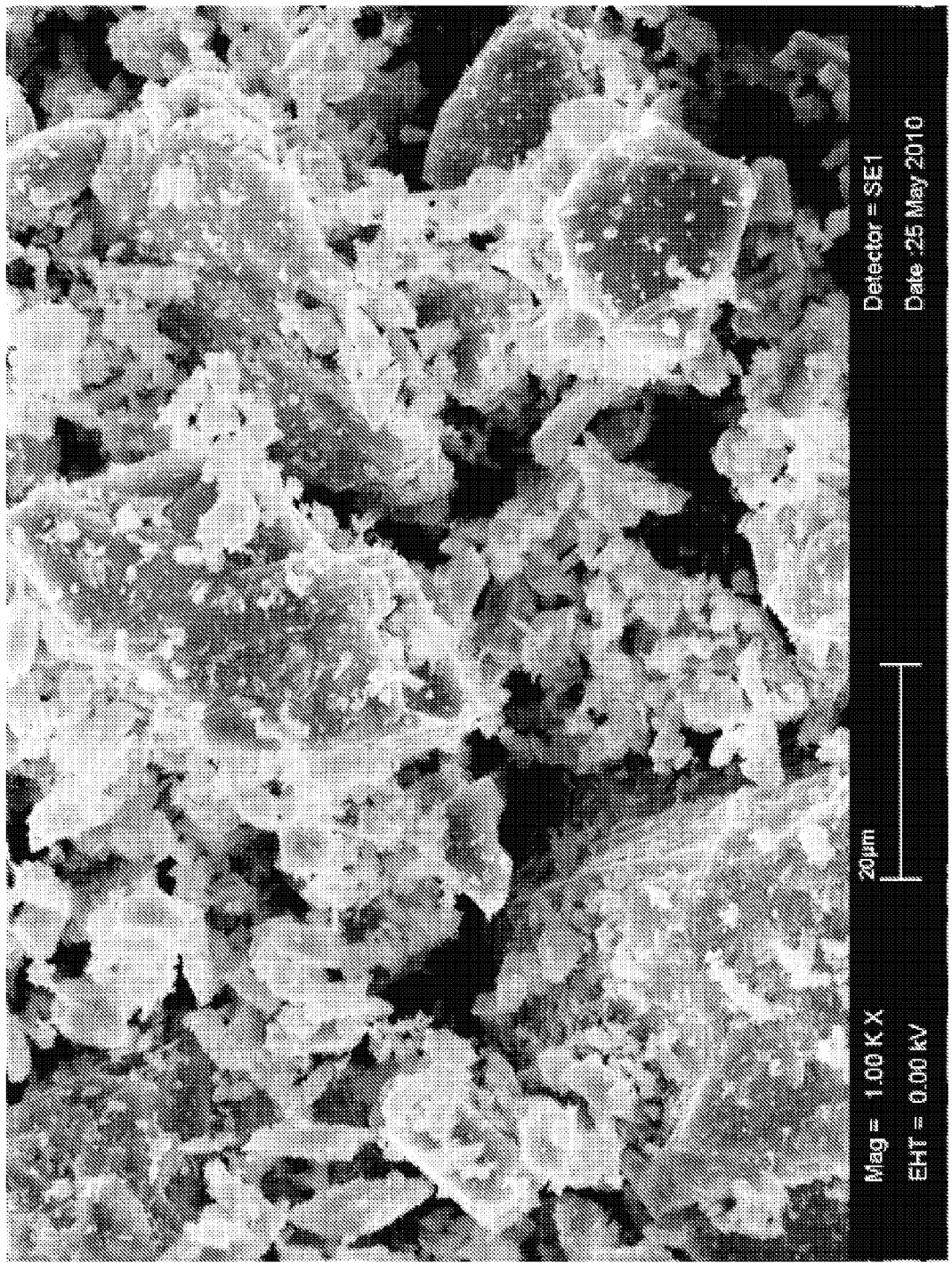
FIG. 8 is a scanning electron micrograph of a vanadium material, according to illustrative embodiments of the invention.

The vanadium composition was prepared using a nominal procedure that included: (1) contacting precursors $Li_2CO_3$, $V_2O_5$, and $NH_4H_2PO_4$ in a stoichiometric ratio; (2) ball milling in acetone for 48 hours at 300 RPM; (3) manually grinding, pelletizing, and heat treating at 300° C. for 6 hours in air; and (4) manually grinding, pelletizing, and heat treating at 800° C. for 24 hours in 97% Ar, 3% $H_2$. Tests were performed on Perfluoroalkoxy (PFA) SWAGELOK cells (part # PFA-820-6) at roughly C/20 rate. The total cathode weight in each cell was 2.2-2.3 mg. FIG. 7 is a plot of voltage versus capacity at C/20 rate for the vanadium composition prepared using this nominal procedure. As depicted, a first discharge capacity of approximately 85 mAh/g was achieved in a voltage window of 3-5V. Referring to FIG. 8, particle sizes for the material ranged from approximately 5 microns to approximately 20 microns.

Example 3

Figure 9:
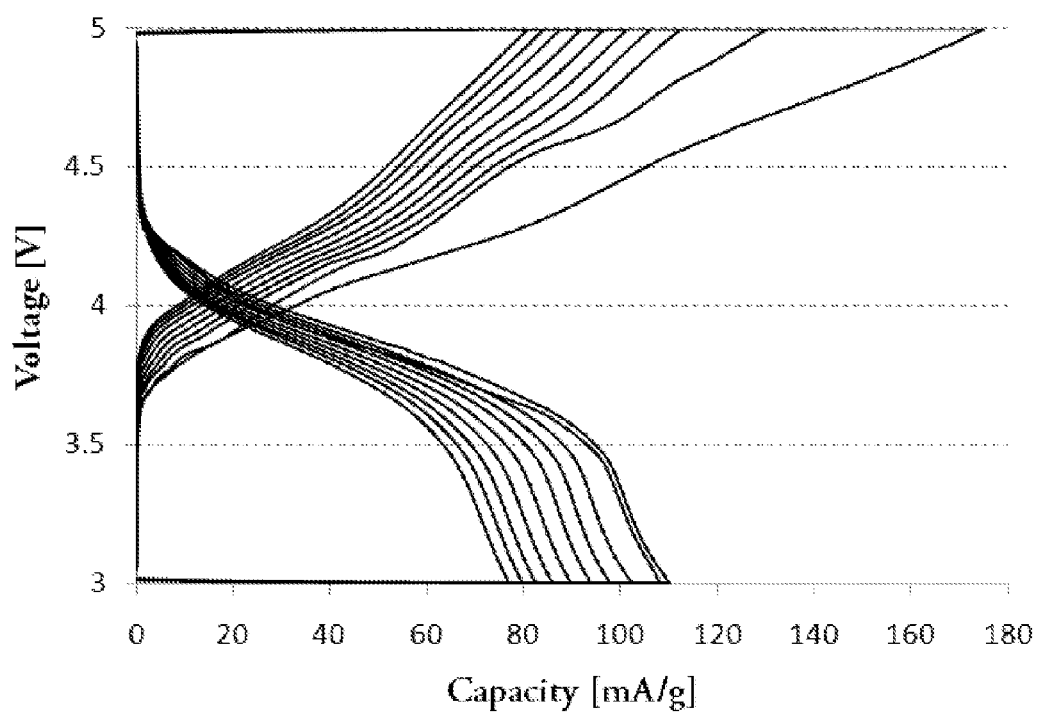
FIG. 9 is a plot of voltage versus capacity at C/20 rate for a vanadium composition, according to illustrative embodiments of the invention.
Figure 10:
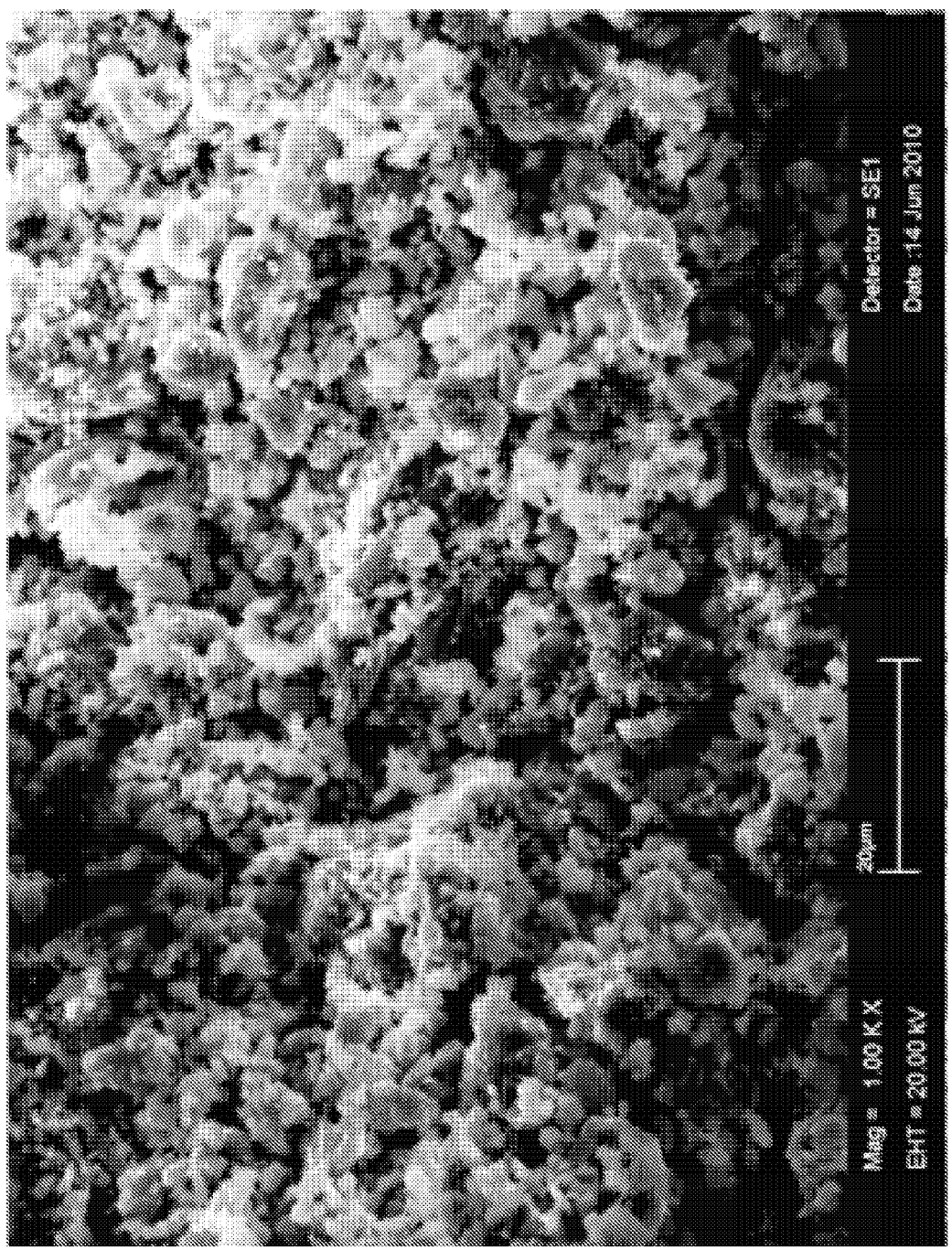
FIG. 10 is a scanning electron micrograph of a vanadium material, according to illustrative embodiments of the invention.

The vanadium composition was prepared using a carbon coat procedure that included: (1) contacting precursors $Li_2CO_3$, $V_2O_5$, and $NH_4H_2PO_4$ in stoichiometric ratio; (2) placing the powders in 50 ml stainless steel vials with three 10 mm stainless steel balls and fifteen 3 mm stainless steel balls and mixing the precursors in a Retsch PM 200 planetary ball mill for 12 hours at 400 RPM; (3) manually grinding, pelletizing, and heat treating at 300° C. for 6 hours in air; (4) manually grinding, pelletizing, and heat treating at 800° C. for 12 hours in 97% Ar, 3% $H_2$; and (5) mixing in a planetary ball mill with 15% SUPER P® carbon (by weight) for 6 hours at 400 RPM. Tests were performed on Perfluoroalkoxy (PFA) SWAGELOK cells (part # PFA-820-6) at roughly C/20 rate. The total cathode weight in each cell was 2.2-2.3 mg. FIG. 9 is a plot of voltage versus capacity at C/20 rate for the vanadium composition prepared using the carbon coat procedure in Example 3. As depicted, compared to the vanadium material produced using the nominal procedure of Example 2, the carbon coat procedure improved the discharge capacity from 85 mAh/g to approximately 110 mAh/g and also greatly improved capacity retention. As depicted in FIG. 10, the carbon coat procedure produced particle sizes from about two to about five microns.

Example 4

Figure 11:
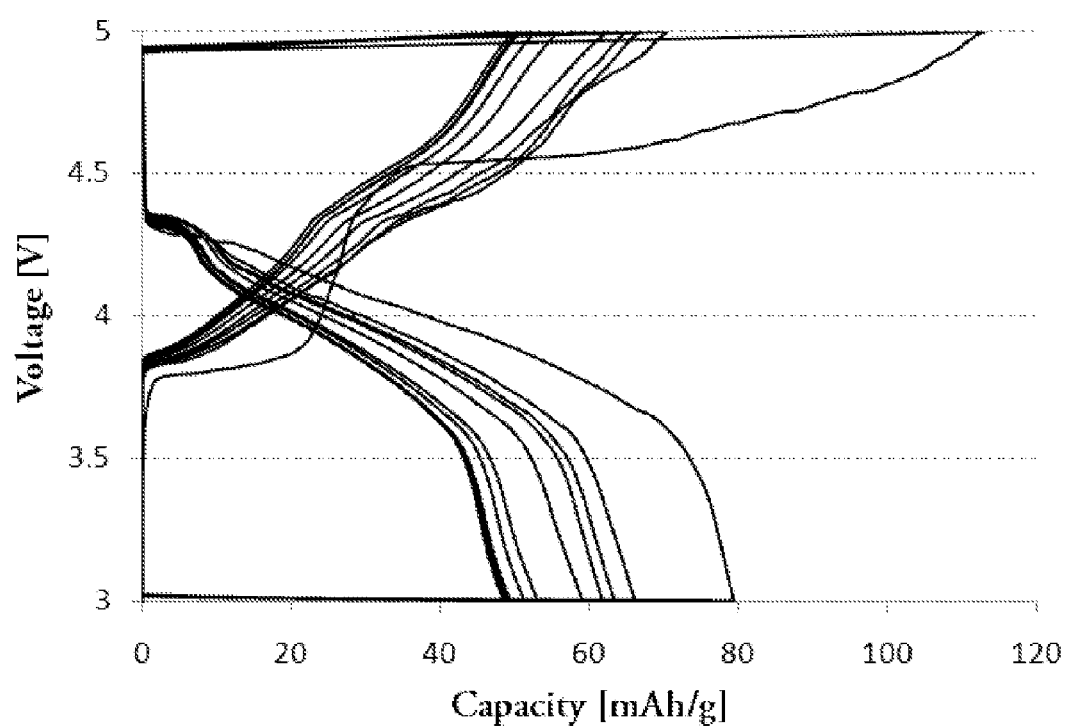
FIG. 11 is a plot of voltage versus capacity at C/20 rate for a vanadium material, according to illustrative embodiments of the invention.
Figure 12:
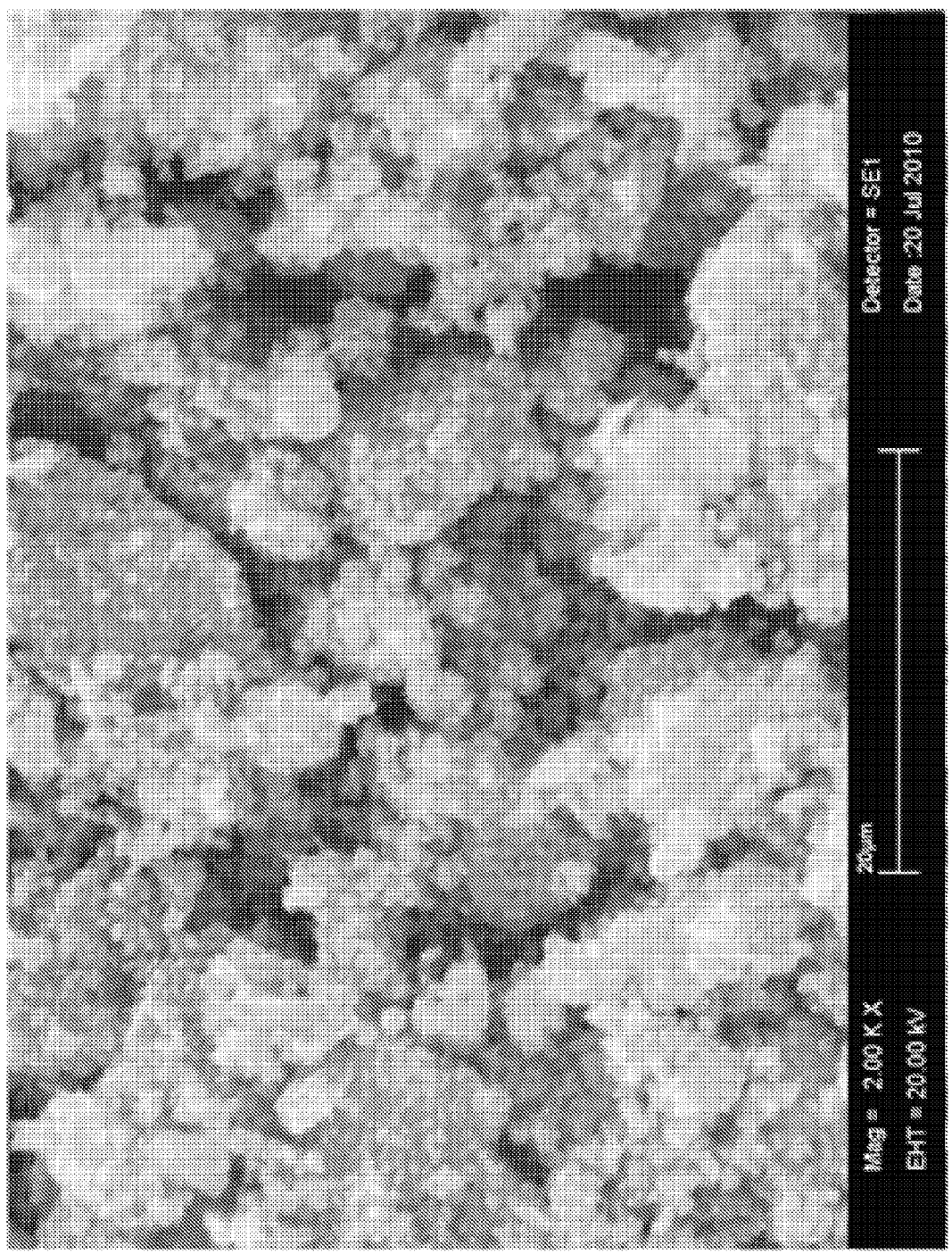
FIG. 12 is a scanning electron micrograph of the vanadium material, according to illustrative embodiments of the invention.

The vanadium composition was prepared using a carbothermal synthesis procedure that included: (1) mixing precursors $Li_2CO_3$, $V_2O_5$, and $NH_4H_2PO_4$ in stoichiometric ratio along with 15% (by weight) SUPER P® carbon; (2) mixing in a planetary ball mill for 12 hours at 400 RPM; (3) manually grinding, pelletizing, and heat treating at 300° C. for 6 hours in air; and (4) manually grinding, pelletize, and heat treating at 700° C. for 12 hours in 97% Ar, 3% $H_2$. Compared to the nominal procedure of Example 2, the carbothermal procedure of Example 4 was performed at a lower temperature and for a shorter duration and is therefore a simpler and less expensive synthesis procedure. Tests were performed on Perfluoroalkoxy (PFA) SWAGELOK cells (part # PFA-820-6) at roughly C/20 rate. The total cathode weight in each cell was 2.2-2.3 mg. FIG. 11 is a plot of voltage versus capacity at C/20 rate for the vanadium material prepared using the carbothermal procedure. As depicted, the electrochemical performance of the resulting material was similar to that of the material produced using the nominal procedure. Referring to FIG. 12, the scanning electron micrograph of the carbothermal-synthesized material shows evidence of both primary and secondary particles, with the primary particle size ranging from 5 to 15 microns and a secondary particle size of roughly 1 micron.

Referring to FIGS. 7, 9, and 11, the results for Examples 2, 3, and 4 indicate that half the theoretical capacity of 173 mAh/g is readily achievable. FIG. 9 demonstrates reversible capacity exceeding half the theoretical capacity. In addition, FIGS. 7 and 11 demonstrate activity at voltages close to those computationally predicted for the $V^{4+/5+}$ redox couple. Thus, the tests demonstrate that two redox couples may indeed be activated in this material and that the full theoretical capacity may be attained through further optimization.

Regarding reaction pressures for the above examples, the important component of these reactions is typically not the total pressure but rather oxidation strength, which is controlled by the partial pressures of the reducing gases. The experiments themselves were performed under normal atmospheric pressures, but they may also work under a very wide pressure range provided that the oxidation strength is maintained by having the proper proportion of reducing gas. Thus, in most conventional solid-state synthesis such as the examples above, it is the gas mixture that is specified rather than the total pressure.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An electrode material comprising $Li_9(V,Mo)_3(P_2O_7)_3(PO_4)_2$.

2. The electrode material of claim 1, comprising at least one dopant selected from the group consisting of nickel, cobalt, manganese, iron, titanium, copper, silver, magnesium, calcium, strontium, zinc, aluminum, chromium, gallium, germanium, tin, tantalum, niobium, zirconium, fluorine, sulfur, yttrium, tungsten, silicon, and lead.

3. The electrode material of claim 1, wherein (V,Mo) comprises V, Mo, or any combination of V and Mo.

4. The electrode material of claim 1, wherein (V,Mo) is V.

5. The electrode material of claim 1, wherein (V,Mo) is Mo.

6. An electrode material comprising:

$Li_aM_bD_c(P_2O_7)_d(PO_4)_e$ wherein M is at least one of vanadium (V) and molybdenum (Mo);

D is at least one member selected from the group consisting of lithium, sodium, potassium, rubidium, cesium, magnesium, calcium, strontium, barium, nickel, cobalt, manganese, iron, titanium, copper, silver, zinc, aluminum, chromium, gallium, germanium, tin, tantalum, niobium, zirconium, fluorine, sulfur, yttrium, tungsten, silicon, and lead;

$5 \leq a \leq 12$, $1.5 \leq b \leq 4$, $0 \leq c \leq 1.5$, $2.75 \leq d \leq 3.25$, and $1.67 \leq e \leq 2.33$.

7. The electrode material of claim 6, wherein a=9, b=3, c=0, d=3, and e=2.

8. The electrode material of claim 6, wherein M is V.

9. The electrode material of claim 6, wherein M is Mo.

10. A lithium battery comprising the electrode material of claim 1.

11. The lithium battery of claim 10, configured such that at least one member selected from the group consisting of V, Mo, and (V,Mo) is reduced during operation of the battery.

12. A composition of matter comprising $Li_9V_3(P_2O_7)_3(PO_4)_2$.

* * * * *